(12) United States Patent
Jaffri

(10) Patent No.: US 11,195,207 B2
(45) Date of Patent: *Dec. 7, 2021

(54) CONTROLLING AD DELIVERY TO MOBILE CLIENTS

(71) Applicant: Microsoft Technology Licensing, LLC, Redmond, WA (US)

(72) Inventor: Taqi Jaffri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/880,838

(22) Filed: May 21, 2020

(65) Prior Publication Data

US 2020/0286126 A1 Sep. 10, 2020

Related U.S. Application Data

(63) Continuation of application No. 12/487,118, filed on Jun. 18, 2009, now Pat. No. 10,679,251.

(51) Int. Cl.
*G06Q 30/02* (2012.01)
*H04W 4/23* (2018.01)
(Continued)

(52) U.S. Cl.
CPC ......... *G06Q 30/0261* (2013.01); *G06Q 30/02* (2013.01); *G06Q 30/0251* (2013.01);
(Continued)

(58) Field of Classification Search
CPC ........... G06Q 30/0261; G06Q 30/0254; G06Q 30/0267; G06Q 30/02; G06Q 30/0275;
(Continued)

(56) References Cited

U.S. PATENT DOCUMENTS 7,024,552 B1 * 4/2006 Caswell ............... G06Q 20/367
713/155
2005/0086510 A1 * 4/2005 Nicodemus ......... H04L 63/0272
726/26

(Continued)

OTHER PUBLICATIONS

"Office Action Issued In Brazilian Patent Application No. PI 1012829-8", dated Mar. 12, 2020, 9 Pages.

(Continued)

*Primary Examiner* — Mario C. Iosif
(74) *Attorney, Agent, or Firm* — Alleman Hall Creasman & Tuttle LLP

(57) ABSTRACT

Systems and methods for controlling ad delivery to mobile clients while maintaining user privacy are herein provided. One exemplary method involves a location broker service. The method includes receiving, at an ad delivery service, a location use token from a mobile client, which may be a single use token. The method includes sending, from the ad delivery service, the location use token to the location broker service for verification at the location broker service. The method includes receiving, at the ad delivery service, the mobile client location from the location broker service based on the verification. The method includes delivering, from the ad delivery service, a location-targeted ad to the mobile client at the mobile client location, where the delivering is further based on a geographic density of a plurality of mobile clients. An advertiser using the ad delivery service may be billed based on location use token history.

20 Claims, 3 Drawing Sheets

(51) Int. Cl.
*H04W 4/029* (2018.01)
*H04W 4/18* (2009.01)

(52) U.S. Cl.
CPC ..... *G06Q 30/0254* (2013.01); *G06Q 30/0267* (2013.01); *G06Q 30/0275* (2013.01); *H04W 4/029* (2018.02); *H04W 4/18* (2013.01); *H04W 4/23* (2018.02)

(58) Field of Classification Search
CPC ...... G06Q 30/0251; H04W 4/18; H04W 4/23; H04W 4/029
See application file for complete search history.

(56) References Cited

U.S. PATENT DOCUMENTS

| | | | | |
|---|---|---|---|---|
| 2007/0244750 | A1* | 10/2007 | Grannan | G06Q 30/0267 705/14.64 |
| 2008/0045232 | A1* | 2/2008 | Cone | H04L 67/18 455/456.1 |
| 2008/0280626 | A1* | 11/2008 | Choi | H04L 63/12 455/456.1 |

OTHER PUBLICATIONS

"Office Action Issued in Brazilian Patent Application No. PI 1012829-8", dated Jun. 24, 2020, 7 Pages.

* cited by examiner

CONTROLLING AD DELIVERY TO MOBILE CLIENTS

CROSS REFERENCE TO RELATED APPLICATIONS

This application is a continuation of U.S. patent application Ser. No. 12/487,118, filed Jun. 18, 2009, the entirety of which is hereby incorporated herein by reference for all purposes.

BACKGROUND

Advertisers wish to target an advertising campaign to users most likely to be influenced by the advertising campaign. At the same time, recipients of advertising typically desire personal privacy. As a result, it has been a challenge to develop an advertising system that balances an advertiser's wish for targeted advertising while maintaining a user's desire for personal privacy. These competing desires have presented a particular challenge to the adoption of location-based advertising on mobile computing devices.

SUMMARY

Systems and methods for controlling ad delivery to mobile clients are herein provided. One example method is for controlling ad delivery from an ad delivery service to a mobile client using a location broker service. The method may include receiving a location use token from a mobile client, and sending the location use token to a location broker service for verification at the location broker service. The method may further include receiving the mobile client location from the location broker service based on the verification of the location use token. The method may further include delivering a location-targeted ad to the mobile client at the mobile client location. The method as described may be executable at an ad delivery service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
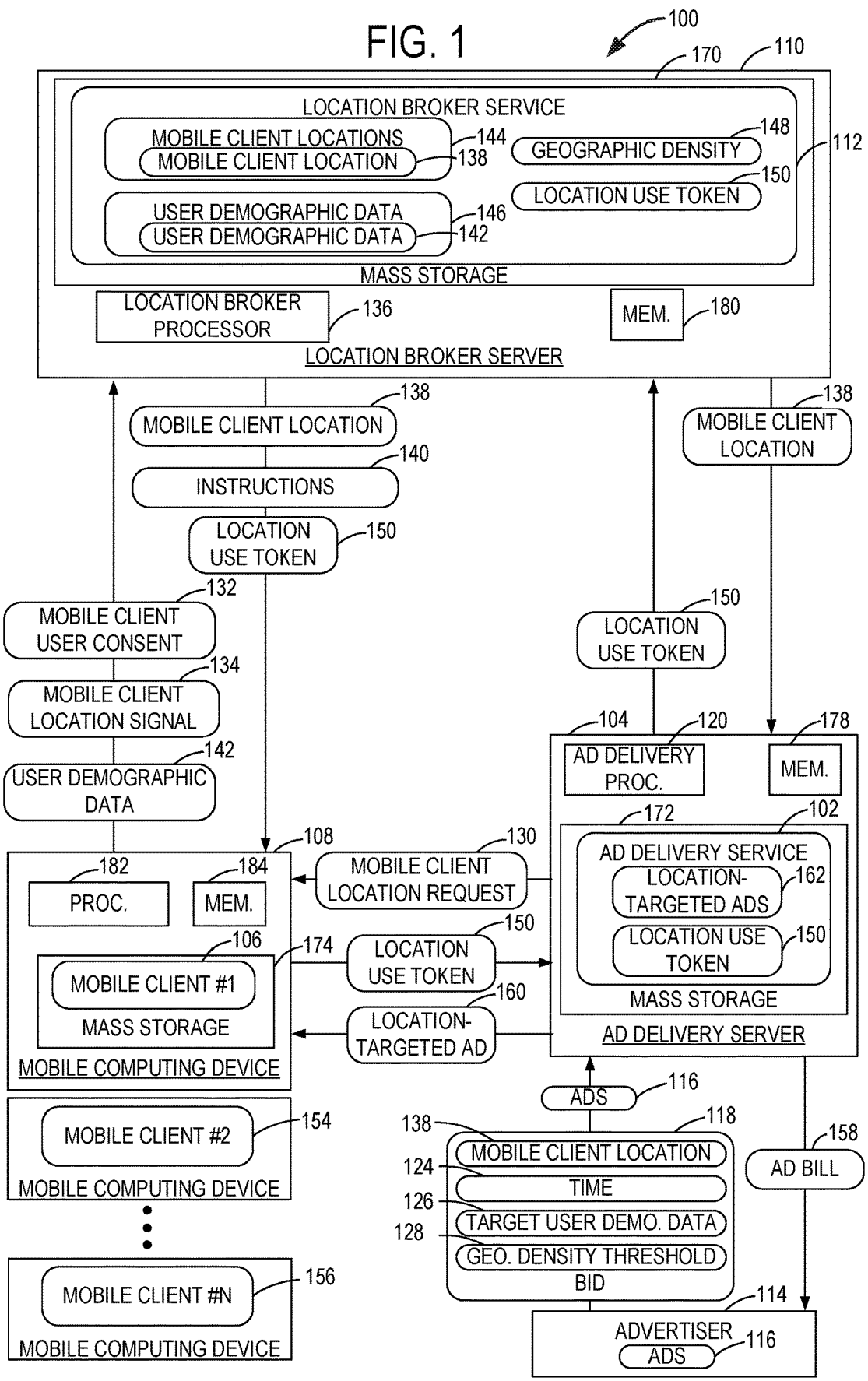
FIG. 1 shows a schematic view of an example advertising system for controlling ad delivery from an ad delivery service to a mobile client.

FIG. 1 illustrates an exemplary advertising system 100 for controlling ad delivery from an ad delivery service 102 executable on an ad delivery server 104 to a mobile client 106 (e.g., mobile client #1) executable on a mobile computing device 108. The advertising system 100 includes a location broker service 112 executable on a location broker server 110 for interacting, as a trusted broker, with the mobile client 106 and the ad delivery service 102. The location broker service 112 is a program that is executed on location broker server 110, and responds to requests for the location of mobile clients 106 from the ad delivery service 102. In some examples, the location broker service 112 can verify a mobile client location for the ad delivery service 102 without disclosing a precise mobile client location to the ad delivery service 102. Thus, the use of the location broker service 112 may help to maintain privacy of a mobile client user of the mobile client 106 while enabling location-targeted ad delivery by the ad delivery service 102 to the mobile client 106. It will be appreciated that a location-targeted ad is an ad that is requested by an advertiser to be delivered to a mobile client 106 that is detected at a specified location.

Within system 100, the mobile client user of the mobile client 106 may share information regarding the mobile client user's location and/or demographic data with the location broker service 112. The location broker service 112 may verify the information, and provide restricted access to the information to the ad delivery service 102. In another example, the location broker service 112 may generalize the information and provide the generalized information to the ad delivery service 102. In this way, the advertiser 114 can provide one or more ads 116 to the ad delivery service 102, which may then deliver location-targeted ads to mobile clients such as mobile client 106 at mobile client location 138, while the advertiser 114 remains blind or partially blind to the mobile client user's information (e.g., location, demographic data). Thus, a mobile client user of the mobile client 106 may be more willing to provide in-depth personal information, and thus, targeted advertising can be provided. Examples of such generalization techniques are discussed below.

In another example, the location broker service 112 may associate the information with another source of information to further refine the information and provide the refined information to the ad delivery service 102. For example, a mobile client user may have multiple devices including a vehicle computer, a mobile client, and a laptop, and each of the devices may communicate with the location broker service 112. As such, the location broker service 112 may receive information from the vehicle computer regarding the vehicle's location (e.g., as identified by vehicle GPS) and associate the vehicle's location with all of the devices, such that a user's "virtual identity" is associated with the vehicle's location. The virtual identity of the user is stored data representing the user that is created and managed by the location broker service 112 based on the detection of the location of the plurality of mobile clients associated with the user. Thus, single use tokens, discussed in detail below, of the vehicle computer, the mobile client, and the laptop may all be associated with the vehicle's location. Further, a single use token of the mobile client may be enabled to allow delivery of an ad to any of the devices including the vehicle computer and the laptop. In one example, this may be allowed if the devices are within a predetermined proximity to one another while the vehicle is at a given vehicle location.

By targeting ad delivery to mobile client users most likely to respond to ads, an advertiser can avoid repeating ads to a same set of users unlikely to respond, thereby avoiding fatigue on the part of mobile client users and a drop-off in effectiveness of advertising.

The delivery of an ad by system 100 may begin with a request from advertiser 114 to place the ad. Advertiser 114 may send a bid 118 to the ad delivery service 102 in order to purchase location-targeted ad delivery via the ad delivery service 102. A location-targeted ad may be any ad designated for delivery to mobile clients at a verifiable mobile client location. A location-targeted ad may further be designated for delivery to mobile clients having a particular user demographic profile and/or at a designated time, in addition to the particular mobile client location, as discussed in detail below. It will be appreciated that bid 118 may include other suitable characteristics for targeting the ad, such as keyword search terms, etc.

Accordingly, the ad delivery service 102 may include instructions executable by the ad delivery processor 120 using portions of associated memory 178, to receive the bid 118 from the advertiser 114 for delivering location-targeted ads to a plurality of mobile clients (e.g., mobile client 106, and mobile client 154 through mobile client 156). The bid may include a mobile client location 138 to which one or more ads 116 are to be delivered, and a predetermined time 124 for delivering of the one or more ads 116. Thus, the ads 116 may be received at the ad delivery service 102 and defined as location-targeted ads 116 based on the mobile client location 138 included in the bid 118.

The bid 118 may also include a target user demographic data 126 including one or more of an age (e.g., specific age, age range, etc.), a gender (e.g., male, female, unspecified, both, etc.), a language (e.g., English, Spanish, French, etc.), a behavior (e.g., a search query, a blogging frequency, website visitations, etc.), and a psychographic characteristic (e.g., characteristics of mobile client user's personality, values, attitudes, interests, lifestyle, etc.) of mobile clients to which the advertiser 114 wishes to target. For example, a bid for an English-language hamburger advertisement may include target user demographic data specifying an age range of 40-50 years, a gender of male, a language of English, a behavior of attending sports games, and/or a psychographic characteristic of the mobile client user that the user is likely to respond to food ads at sports games. By receiving bids for delivering ads to specified mobile client locations at predetermined times and/or to mobile client users with target user demographic data, the system 100 is more likely to be used by advertisers. Further, by providing a wide variety of target user demographic data to which the ads can be targeted, advertisers are more likely to partake in the system as the system allows for ads to be more narrowly targeted to users with a high likelihood of responding to an ad.

The bid 118 may further include a desired geographic density threshold 128 of mobile client users, including said mobile client. That is, the bid 118 may specify that a location-targeted ad is to be delivered when a geographic density of a plurality of mobile clients having target user demographic data at a particular mobile client location is above a geographic density threshold. A geographic density may be a number of mobile client users in a predefined geographic region, such as a density of frequent shopping mall visitors in a shopping mall. The geographic density may be a number of mobile client users within a predefined distance from one another, such that the density is not defined by an actual geographic region, but is rather defined by relative proximity to one another. That is, the density of users may still be considered a density, even if the density of mobile client users is moving.

For example, a geographic density threshold may be a density of fifty mobile client users having an interest in cars within an area of 50,000 square feet. Thus, if at least fifty mobile client users interested in cars are at a car show and all of them are contained in a region of 50,000 square feet inside a building, the geographic density threshold is met, and a location-target ad may be delivered to the plurality of mobile client users. If that group, or crowd, of users moves to a region outside of the original 50,000 square feet (e.g., move outdoors to a car racing track), but are still within a total region of 50,000 square feet, the geographic density threshold is still met and the location-targeted ad may be delivered. If the geographic density exceeds a geographic density threshold, the mobile client users may be eligible to be served a particular advertisement of an advertiser that has placed a bid for that density of mobile client users interested in cars.

By having advertisers place bids on mobile client user densities, the advertising system 100 allows for innovative pricing. For example, a plurality of advertisers may dynamically compete to set pricing for delivering ads to mobile clients at a particular location and a particular time along with other target user demographic information (e.g., mobile client users in a certain age range at a car racing event). Furthermore, advertisers may compete to set pricing for certain mobile client user densities (e.g., for advertising at concerts where certain audience demographics are congregated).

Advertisers may be interested in competing for a mobile client user density so that the advertisers can offer "group discounts" to mobile client users of mobile clients of the mobile client user density. That is, an advertiser may offer a reduced price for a product or service if a threshold number of potential buyers are in the mobile client user density such that the advertiser will still net a profit if the mobile client users purchase the product or service at the reduced price. The advertiser may have the flexibility to offer such group discounts if the threshold number of potential buyers exist in the mobile client user density and to not offer the group discounts if the number of potential buyers of the mobile client user density is below the threshold number.

Furthermore, the type of ads delivered may be dependent on the density of mobile clients receiving the ads. For example, if the density of a crowd of mobile client users with an interest in cars becomes even denser, the price of serving the ad may be increased. Further, the ads may be interactive, such that mobile client users receiving the ad can interact in order to receive a deal on sports merchandise, music downloads, etc. In another example, the ads may be "lock and key" such that two mobile client users in close proximity to one another that have received the ad interact in order to receive a deal.

Once the advertiser 114 has placed the bid 118 for delivering ads, the ad delivery server 104 may send a mobile client location request 130 to the mobile client 106. The mobile client may be executable by a processor 182 using portions of associated memory 184.

Responsive to receiving the mobile client location request 130, the mobile client 106 may be presented with a user consent request on an associated display (not shown). Thus, the location broker service 112 may receive a mobile client user consent 132 from the mobile client 106, whereby the mobile client 106 can "opt-in" to the advertising system 100. The mobile client user consent 132 may be a one-time user consent, responsive to receiving a mobile client location request 130 from the ad delivery service 102. In still other examples, the mobile client user consent 132 may include a generalized consent whereby the mobile client user agrees to receive location-targeted ads in the future without providing further consent. In other examples, the mobile client user may deny consent, thereby disagreeing to receive location-targeted ads via the advertising system 100. If the mobile client user of the mobile client 106 denies consent, the advertiser 114 may not send location-targeted ads to the mobile client 106. By receiving user consent, the system 100 effectively enables mobile client users to select whether or not, and how much personal information to share with the location broker service.

Responsive to the sending of the mobile client location request 130 from the ad delivery service 102, and where mobile client user consent 132 has been received, the mobile client 106 may send a mobile client location signal 134 (e.g., visible beacons) to the location broker service 112. In this example, location broker service 112 may be executable by the location broker processor 136 using portions of associated memory 180 on the location broker server 110. The location broker service 112 may include instructions executable by the location broker processor 136 for receiving the mobile client location signal 134 from the mobile client 106, and for determining a mobile client location 138 based on the mobile client location signal 134. In some cases, the location broker service 112 may determine the precise location (e.g., latitude, longitude, orientation, etc.) of the mobile client 106 whereas in other cases, a location range, or a generalized location, i.e., a region (e.g., zip code, city, etc.) may be determined.

The location broker service 112 may also store said mobile client location 138 along with user demographic data 142 received from the mobile client 106. Further, the location broker service 112 may store mobile client locations 144 of the remaining of the plurality of mobile clients (e.g., mobile client 154 through mobile client 156) and user demographic data 146 of the plurality of mobile clients. By doing this, the location broker service 112 can provide a predictive ad targeting service for targeting ads to mobile clients at particular locations at predetermined times.

Responsive to receiving the mobile client location signal 134, the location broker service 112 may execute instructions, using the location broker processor 136, to send a location use token 150 associated with the mobile client location 138 to the mobile client 106. In some cases the mobile client location 138 may also be sent to the mobile client. The location use token 150 is a unit of data, such as a string, integer, or other data type, that may be associated by the location broker service with the mobile client location 138 at which use of the mobile client 106 is detected. The location use token 150 itself is not data directly indicating the mobile client location 138, but is data that may be used by the location broker service 112 to identify the mobile client location 138 for a particular mobile client 106. In some cases, the location use token 150 is sent to the mobile client 106 responsive to the receiving of the mobile client location request 130 at the mobile client 106 from the ad delivery service 102. By sending the location use token 150 to the mobile client 106 for later upload to the ad delivery service 102, sending of sensitive location data directly from the mobile client to the ad delivery service can be avoided, and the mobile client user's privacy can be maintained, as will be appreciated by the description below. Further, use of the location use token 150 enables verification of the location of the mobile device 106 by the location broker service 112, and once verified, enables the ad delivery service 102 to deliver and bill for an ad served to a verified location, as discussed in detail below.

Thus, the location use token 150 may thereafter be sent by the mobile client 106 to the ad delivery service 102, responsive to a mobile client location request 130. The ad delivery service 102 includes instructions executable by an ad delivery processor 120 for receiving the location use token 150 from the mobile client 106. The ad delivery service 102 may further include instructions executable by the ad delivery processor 120 for sending the location use token 150 to the location broker service 112 for a verification.

The verification of the location use token 150 may include a location verification or a location determination. In another example, the verification may include determining that the location use token 150 originated from the location broker service 112, and/or that it is not a fraudulent, or duplicate, location use token.

The verification of the location use token 150 received from the ad delivery service 102 may also include determining that the mobile client 106 associated with the location use token is included in a geographic density 148 of mobile clients above a geographic density threshold (e.g., the geographic density threshold 128 specified by the bid 118). For example, the location broker service 112 may include instructions executable by the location broker processor 136 to identify a plurality of mobile clients having a target user demographic data, including said mobile client, and to calculate a geographic density 148 based on a number of the plurality of mobile clients (including said mobile client 106) within a predetermined area. Thus, the verification may include verifying that the location use token originated from a mobile client included in the geographic density identified by the location broker service 112. Based on the geographic density of the plurality of mobile clients, ads may be served to the plurality of mobile clients using location use tokens as described below. In this way, ads can be sent to a crowd of mobile client users when mobile client users with a common user demographic characteristic are congregated in a region (e.g., when a volume of teenagers are in a mall, when a volume of sports fans are at a baseball game, etc.).

The verification may also include determining that the mobile client user has a particular user aggregate attribute (e.g., included in a particular density of users in a particular location, is moving with a crowd of users where the crowd has a predetermined density, etc.). The location use token 150 may also be verified by determining that a mobile client user fits a target user demographic profile.

Upon verification of the location use token 150, the ad delivery service 102 may receive the mobile client location 138 from the location broker service 112. The mobile client location 138 is data representing a detected location of the mobile client 106, and may be appropriately fuzzed to be a generalized location, i.e., a region, depending on privacy guidelines or user privacy preferences, as some examples. For example, an exact location of the mobile client 106 may be 47.674N latitude, −122.12W longitude, while the generalized location may be the city of Redmond, Wash. USA. Thus, the mobile client location 138 may be made to be a location that is more general than the location data that is known by the location broker service 112. By providing a generalized location as the mobile client location 138, the system 100 may protect a mobile client user's privacy. In still other examples, a mobile client user may be provided with a graphical user interface by which the mobile client user can modify and/or delete a mobile client location history. Since the mobile client location 138 is sent to the ad delivery service 102 by the location broker service rather than individual mobile clients 106, the policies that govern how the location data is generalized may be centrally managed at the location broker service 112.

Once the ad delivery service 102 receives the mobile client location 138, the ad delivery server 104 can execute instructions for delivering a location-targeted ad 160, from a plurality of location-targeted ads 162, to the mobile client 106 at the mobile client location 138 with the use of the ad delivery processor 120.

The location use token 150 received at the ad delivery server 104 from the mobile client 106 may be a single use token, such that subsequent attempts by the ad delivery service 102 to use the location use token 150 (e.g. by sending it to the location broker service 112) may be denied. A single use token is a token that is valid only for a single use. The first time the ad delivery service 102 attempts to verify the single use token with the location broker service 112, a verification may be sent from the location broker service 112 to the ad delivery service 102. However, subsequent attempts to verify the same single use token will be denied by the location broker service 112. Thus, the ad delivery service 102 sends a new mobile client location request to the mobile client 106 and receives a new location use token from the mobile client 106 each time the ad delivery service 102 wishes to send a location-targeted ad to the mobile client 106.

In some cases, the location broker service 112 may also send the actual mobile client location 138 to the mobile client 106 responsive to the sending of the mobile client location signal 134 to the location broker service 112 from the mobile client 106. This may be done, for example, if a mobile client user successively, or frequently, uses the mobile client 106 in the same location (e.g., at home, at work, etc.). Thus, the location broker service 112 may also send instructions 140 to the mobile client 106 to store the mobile client location 138 in a cache on the mobile computing device 108, and to refrain from sending a future mobile client location signal to the location broker service 112 once the mobile client location 138 has been sent to the mobile client 106. In such a case, a plurality of location use tokens may be sent from the location broker service to the mobile client. Such an example is discussed in detail with respect to FIG. 2.

The ad delivery service 102 further includes instructions executable by the ad delivery processor 120 to send an advertising bill 158 to the advertiser 114 based on delivery of the location-targeted ad 160 responsive to verification of the location use token 150 at the location broker service 112. That is, the advertiser 114 can be billed as a function of the location use tokens that the ad delivery service 102 sent to the location broker service 112 on behalf of the advertiser 114. The advertiser 114 may be periodically billed at a targeted advertising rate based on a number, or frequency of location use token use, as just some examples. In this way, the billing can be independently auditable, and the advertiser 114 can be confident the ads were location- and/or demographic-targeted while still maintaining the privacy of the mobile client users. Thus, advertising fraud can be avoided as the location broker service 112 may necessarily verify the validity of the location use token 150 before the advertiser 114 can be billed for use of the location use token 150 by the ad delivery service 102.

Further, the advertiser 114 may be billed as a function of the mobile client user's location, as well as an overall density of mobile client users, such that the advertiser 114 is billed at a higher rate for high-value locations, or densities. An advertising bill 158 may also reflect the mobile client user's behavior (e.g., an advertiser may be billed more for advertisements sent to mobile client users that frequent shopping malls).

The location broker service 112 and the ad delivery service 102 may be independent servers, as illustrated in FIG. 1, and may operate in separate server farms, or a common server farm. Alternately, the location broker service 112 and the ad delivery service 102 may be integrated into one server, or may be operated by one entity.

It may be appreciated that the location broker processor 136 and/or the ad delivery processor 120 may be provided on one server. In another example, the location broker processor 136 and the ad delivery processor 120 may be one integrated processor.

It may be further appreciated that the location broker service 112 may be a program executable locally on a location broker server, or executable remotely on an additional server. Similarly, the ad delivery service 102 may be a program executable locally on an ad delivery server, or the ad delivery service 102 may be executable remotely on an additional server. Further still, the location broker service 112 and ad delivery service 102 may be executable on a same server using a same processor. As shown, location broker service 112 may be stored on mass storage 170, ad delivery service 102 may be stored on mass storage 172, and mobile client 106 may be stored on mass storage 174 although other arrangements are suitable. Furthermore, a processor configured to execute the location broker service 112 and/or the ad delivery service 102 may be located outside of a server on which the location broker service 112 and/or the ad delivery service 102 are stored.

Although the location broker service 112 is shown in FIG. 1 as interacting with both the mobile client 106 and the ad delivery service 102, the location broker service 112 may be one of many services, or servers, in a trust chain hierarchy, or certificate trust chain. A trust chain hierarchy is a hierarchy of trusted certification authorities used to authenticate digital certificates. A certificate trust chain includes all of the certificates needed to certify a subject identified by an end certificate. In practice this includes an end certificate, certificates of intermediate certification authorities, and a certificate of a root certification authority of trusted by all certification authorities in the chain. As one example of chaining together location broker services in such a trust chain hierarchy, a mobile client user may first contact a location broker service in a corporate local area network in the case of a controlled corporate scenario, prior to attempting to contact an external location broker service.

Communication between a location broker service in a trust chain hierarchy and the mobile client, as well as communication between a location broker service and the ad delivery service may be secured by use of a secure communications protocol (e.g., https, etc.) that is resistant to eavesdropping.

Figure 2A:
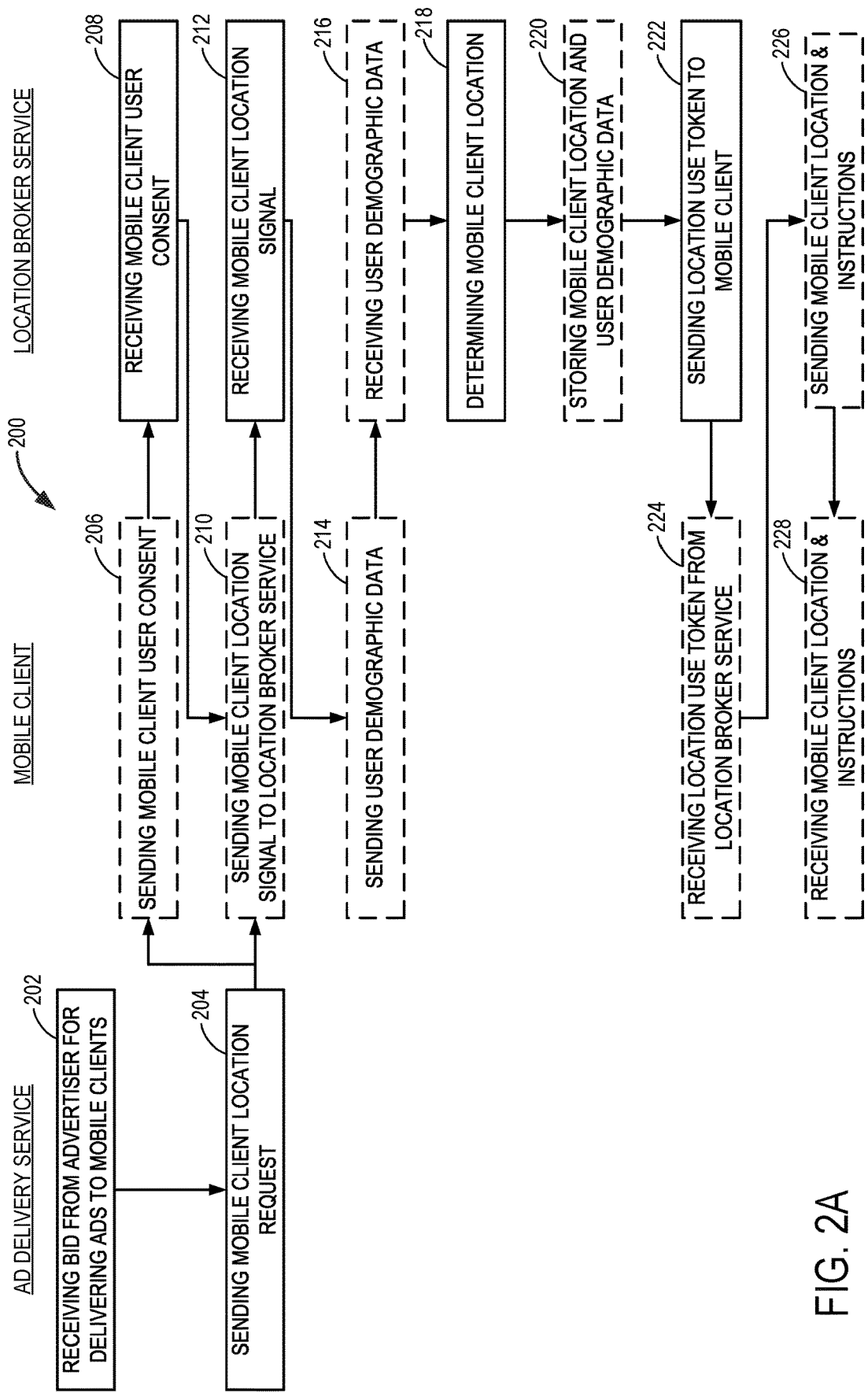
FIGS. 2A and 2B show a flowchart illustrating an example method for controlling ad delivery from an ad delivery service to a mobile client using a location broker service.
Figure 2B:
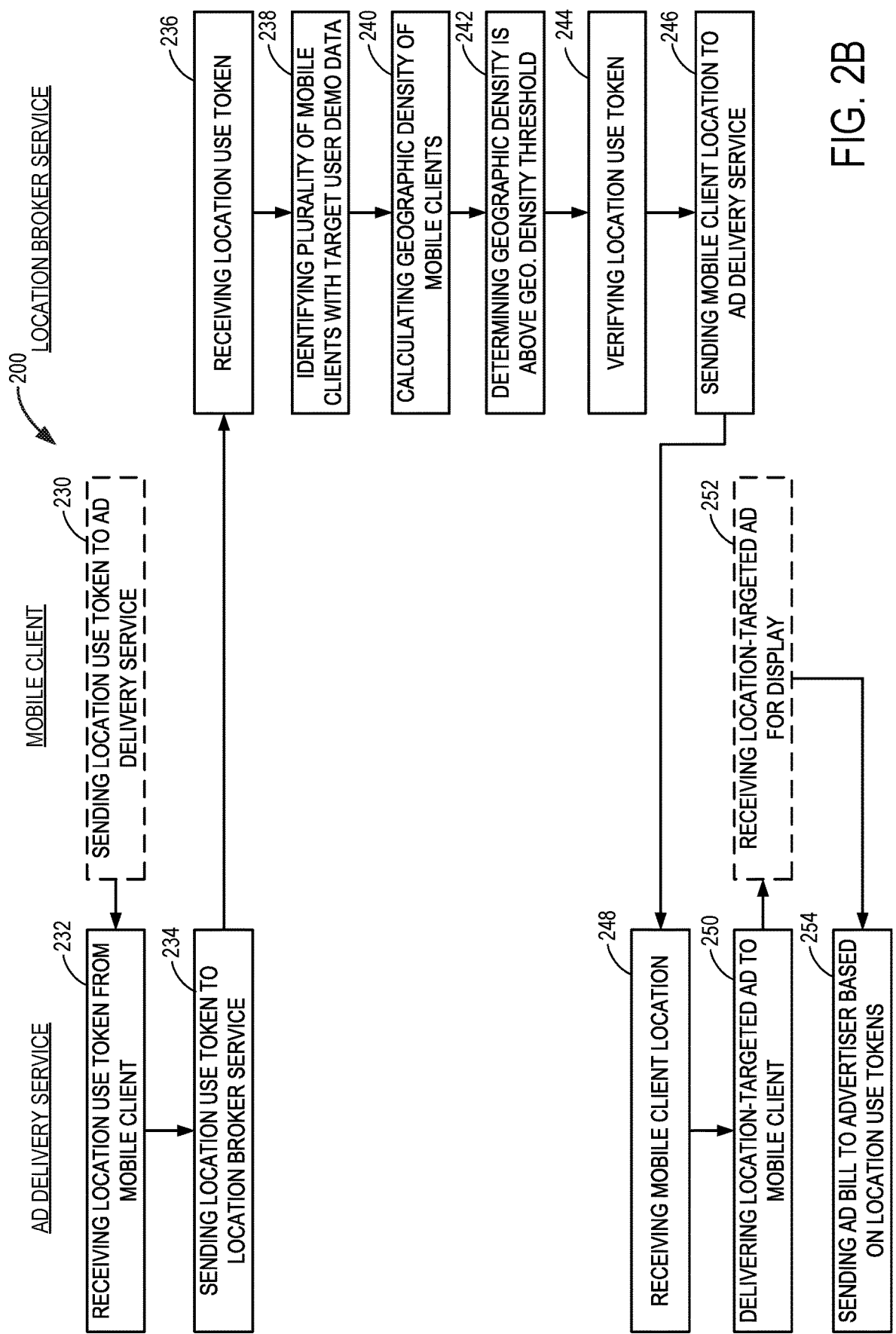

Turning now to FIG. 2A and FIG. 2B, a flowchart illustrates an exemplary method 200 for controlling ad delivery from an ad delivery service to a mobile client using a location broker service. The method 200 and/or other processes described herein may be implemented by a system including hardware such as that described with respect to FIG. 1. In other examples the method 200 and/or other processes described herein may be implemented by other suitable systems.

At 202, the method 200 includes receiving, at the ad delivery service, a bid for delivering ads to a plurality of mobile clients at the mobile client location, including said mobile client. The bid may include a predetermined time for delivering the ads. Advertisers may be more willing to partake in a system that receives bids for delivering ads to a mobile client at the mobile client location at a predetermined time because such a system allows advertisers to narrowly target ads to potential consumers.

The method 200 may also include sending, from the ad delivery service, a mobile client location request to the mobile client at 204. The sending at 204 may occur, for example, when a mobile client user is visiting a website and the ad delivery service requests to know the mobile client's location.

In some examples, mobile client user consent may be requested at the mobile client in the form of a graphical user interface whereby a user can opt-in, or opt-out of the system, responsive to sending of the mobile client location request at 204. If a mobile client user denies consent, the ad delivery service may not be able to send location-targeted ads to the associated mobile client. However, at 206, the method 200 may include sending a mobile client user consent from the mobile client to the location broker service. Thus, the method 200 may include receiving the mobile client user consent at the location broker service from the mobile client at 208, and proceeding to step 210. By receiving mobile client user consent at the location broker service prior to receiving the mobile client location signal, privacy of mobile client users can be maintained until the user opts-in, as one example.

In other examples, the location broker service may utilize a prior user consent database to silently service the mobile client location request of 204 using a stored user consent. In this latter example, the method 200 may proceed directly from step 204 to step 210.

At 210, the method 200 may include sending, from the mobile client, a mobile client location signal to the location broker server. Thus, the method 200 may include receiving, at the location broker service, a mobile client location signal from the mobile client at 212. In some cases, the receiving of the mobile client location signal at the location broker service from the mobile client may occur responsive to the receiving of the mobile client user consent from the mobile client at 208. Receiving the mobile client location signal at the location broker service may include receiving information regarding different fixed beacons (e.g., cell towers, Wi-Fi access points, FM radios, etc.) visible to the mobile computing device at the mobile client, from the mobile client. The receiving of the mobile client location signal may also include receiving information regarding non-fixed beacons, such as peer-to-peer BLUETOOTH signals and other information regarding the environment of the mobile computing device 108. As discussed below, the use of non-fixed beacons may assist in a calculation of mobile client user density. At the mobile client in step 210, or at the location broker service at step 212 or step 218, the mobile client location signal or mobile client location may be randomly rendered inaccurate or generalized to a larger region, in cases where mobile client user privacy is desired.

The method 200 may further include sending user demographic data from a mobile client at 214, and thus, receiving user demographic data at the location broker service at 216.

At 218, the method 200 may include determining, at the location broker service, a mobile client location based on the mobile client signal. At 220, the method 200 may include storing the mobile client location, along with the user demographic data, at the location broker service responsive to determining the mobile client location at 218 and/or responsive to receiving the user demographic data. Thus, the stored mobile client location and user demographic data can be later used to provide a predictive ad targeting service for targeting ads to mobile clients at particular locations at predetermined times.

The method 200 may include sending a location use token associated with the mobile client location from the location broker service to the mobile client at 222. Accordingly, the method 200 may include receiving the location use token from the location broker service at 224. Use of a location broker service to receive the mobile client location signal, determine the mobile client location, and send the location use token associated with the mobile client location may help to maintain privacy of the mobile client user while enabling location-targeted ad delivery by the ad delivery service to the mobile client, as described herein.

The mobile client location and user demographic data may not be shared with the ad delivery service, as the information sent to the ad delivery service is the location use token for a particular mobile client location request. In other words, location history, and user behavior may be used by the location broker service to predict a current location for advertisers, and can be centrally cleared, edited, and/or the use thereof can be managed by the mobile client user of a mobile client via a graphical user interface. In this way, the location broker service can respond to an advertiser's bid by enabling the ad delivery service to send ads to those mobile clients that meet the location and/or the target user demographic data specified in the bid, while the user can maintain his/her privacy.

In some examples, the method 200 may include sending the actual mobile client location to the mobile client from the location broker service responsive to the sending of the mobile client location signal to the location broker service from the mobile client, such as at 226. This may be done, for example, if a mobile client user successively, or frequently, uses the mobile client in the same location (e.g., at home, at work, etc.). Thus, the location broker service may also send instructions, at 226, to the mobile client to store the mobile client location in a cache on the mobile computing device, and to refrain from sending a future mobile client location signal to the location broker service once the mobile client location has been sent to the mobile client. In such a case, a plurality of location use tokens may be sent to the mobile client to be cached and used as requested by the mobile client until the mobile client runs out of location use tokens. In other examples, the mobile client may be sent an unlimited amount of location use tokens. By caching the mobile client location and/or location use tokens at the mobile client, for example, for a mobile client that is repetitively operated at a same location, the system reduces the amount of repetitive communication between components of the system. The mobile client location and instructions may be received at the mobile client at 228.

Continuing to FIG. 2B, the method 200 includes sending the location use token from the mobile client to the ad delivery service at 230. Thus, the method includes receiving, at an ad delivery service, the location use token from the mobile client at 232. In some cases, the receiving of the location use token may occur responsive to the sending of the mobile client location request to the mobile client at 204. In this way, the location use token can be readily used, by the ad delivery service, as described below. The method 200 may include sending the location use token from the ad delivery service to the location broker service at 234 for verification at the location broker service. The method 200 includes receiving the location token from the ad delivery service at 236.

At 238, the method 200 may include identifying, at the location broker service, a plurality of mobile clients having a target user demographic data, including said mobile client. Thus, at 240, the method 200 may include calculating, at the location broker service, a geographic density based on a number of the plurality of mobile clients (including said mobile client) within a predetermined area. The calculating may be implemented using information regarding non-fixed beacons. That is, the geographic density may be calculated based on the radio signals detected in a given environment. For example, the radio frequency environment may be very dense in a metropolitan area, thereby leading to a calculation of a high geographical density whereas the radio frequency environment may be less dense in a forest, thereby leading to a calculation of a low geographical density. To determine radio frequency density for a geographic location, a scan of radio frequencies in a predetermined spectrum may be performed by a mobile client at the geographic location and a number of detected signals may be recorded. The number of detected signals may be compared against a predetermined threshold to determine whether the geographic location is in a city, for example. Further, information regarding such radio frequency scans may be aggregated from a plurality of mobile clients in a geographic location, and used to compute a radio frequency density based on signals received at each mobile client. This may produce more accurate results, since the radio frequency reception at any given mobile client may be adversely affected by its physical environment, such as surrounding buildings, etc.

Thus, at 242, the method 200 includes determining, at the location broker service, that the geographic density of the plurality of mobile clients is above a geographic density threshold (e.g., the target geographic density threshold specified by a bid of an advertiser). Responsive to the determination of the geographic density being above the geographic density threshold, the method 200 may include verifying the location use token at 244. In the method 200, it may be appreciated that the verification of the location use token may occur responsive to receiving the location use token from the ad delivery service at 236. In this way, the location use token can be verified as being associated with a mobile client location of a mobile client that is a part of a target crowd of mobile clients, and ads can be delivered to said mobile client at the mobile client location.

Thus, the method 200 may include sending, at 246, the mobile client location to the ad delivery service responsive to the verifying of the location use token. In this way, the ad delivery service may be enabled to deliver a location-targeted ad to the mobile client at the mobile client location. Specifically, the method 200 includes receiving the mobile client location at the ad delivery service at 248, and delivering, from the ad delivery service, a location-targeted ad to the mobile client at the mobile client location at 250. The location-targeted ad may be received at the mobile client for display at 252.

Thereafter, the method 200 may include sending, at 254, an advertising bill from the ad delivery service to the advertiser based on the delivery of location-targeted ads responsive to verifications of location use tokens at the location broker service, as discussed above. In this way, the advertiser may receive a bill that is a function of the advertiser's own use of the system. Thus, advertisers may more readily use such a system.

It will be appreciated that the computing devices and servers described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor.

It may be appreciated that a "service", as used herein, may be an application program executable across multiple user sessions and available to other operating system components and applications. A service may run on a server responsive to a request from a client.

Further, as used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above. Computer-readable media may include a memory device such as random-access memory (RAM), read-only memory (ROM), a hard disk, a compact disc (CD), digital video disc (DVD), etc. Some or all of the modules described herein may be software modules or hardware components, such as memory devices.

The configurations and/or approaches described herein are exemplary in nature, and these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method performed by an ad delivery service executed on an ad delivery server for controlling ad delivery from the ad delivery service to a mobile client executable on a mobile computing device using a location broker service executable on a location broker server that determines an actual location of the mobile computing device based on a location signal received by the location broker service from the mobile computing device, the method performed by the ad delivery service comprising:

receiving from an advertiser, a bid to purchase location-targeted ad delivery;

sending a mobile client location request to the mobile client;

receiving a single use location use token from the mobile client that is responsive to the mobile client location request, the location use token being previously sent to the mobile client from the location broker service and indicating a generalized location of the mobile computing device without directly indicating the actual location of the mobile computing device;

sending the location use token to the location broker server for verification of the location use token by the location broker service determining that the location use token was previously generated by the location broker service and sent to the mobile computing device by the location broker service;

receiving the generalized location of the mobile computing device from the location broker service upon the location broker service verifying the location use token, without receiving the actual location of the mobile computing device from the location broker service at the ad delivery service; and in response to receiving the bid to purchase location-targeted ad delivery, delivering to the mobile computing device, by the ad delivery service, a location-targeted ad designated for delivery to mobile computing devices at the generalized location.

2. The method of claim 1, wherein the receiving of the location use token from the mobile client, the sending of the location use token to the location broker service, the receiving of the generalized location of the mobile computing device from the location broker service, and the delivering of the location-targeted ad are implemented at the ad delivery service by an ad delivery processor of the ad delivery server.

3. The method of claim 1, wherein the bid is for delivering ads to a plurality of mobile clients, and the bid includes a predetermined time for delivering the ads.

4. The method of claim 1, further comprising:
sending an advertising bill from the ad delivery service to the advertiser based on the delivery of the location-targeted ad following verification of the location use token at the location broker service.

5. The method of claim 1, where the actual location of the mobile computing device is a region, and the generalized location includes the region.

6. A computing system, comprising:
a processor; and
a data storage device having instructions including a location broker service stored thereon executable by the processor to:
receive a mobile client location signal sent by a mobile computing device;
determine an actual location of the mobile computing device based on the mobile client location signal;
generate a single use location use token that indicates a generalized location of the mobile computing device and that does not directly indicate the actual location of the mobile computing device;
send the location use token to the mobile computing device;
receive a purported location use token from an ad delivery service of an ad delivery server;
verify the purported location use token by determining that the purported location use token received from the ad delivery service is the location use token generated and sent to the mobile computing device; and
upon verifying the purported location use token, send the generalized location of the mobile computing device indicated by the purported location use token to the ad delivery service.

7. The computing system of claim 6, wherein the location broker service is further executable by the processor to:
after verifying the purported location use token, receive a subsequent purported location use token from the ad delivery service; and
deny verification of the subsequent purported location use token based on the identifier indicating that the location use token has been used.

8. The computing system of claim 6, wherein the location broker service is further executable by the processor to:
store mobile client location data of the mobile computing device associated with the location use token;
retrieve the mobile client location data responsive to verifying the purported location use token; and
generate the generalized location of the mobile computing device sent to the ad delivery service based on the mobile client location data.

9. The computing system of claim 6, wherein the location broker service is further executable by the processor to:
store mobile client locations of a plurality of mobile client computing devices, including the actual location of the mobile computing device and user demographic data for the plurality of mobile clients including user demographic data for the mobile client.

10. The computing system of claim 9, wherein the location broker service is further executable by the processor to:
to identify a subset of the plurality of mobile clients having target user demographic data including the mobile client, calculate a geographic density based on a quantity of the plurality of mobile client computing devices within a predetermined area, and verify the purported location use token received from the ad delivery service by further determining that the geographic density is above a geographic density threshold.

11. The computing system of claim 10, wherein the target user demographic data is one or more of an age, a gender, a language, a behavior, and a psychographic characteristic.

12. The computing system of claim 6, wherein the location broker service is further executable by the processor to:
receive a mobile client user consent from the mobile client; and
where the receiving the mobile client location signal from the mobile client computing device is responsive to the receiving of the mobile client user consent.

13. The computing system of claim 6, wherein the actual location of the mobile computing device is a region, and the generalized location includes the region.

14. The computing system of claim 6, wherein the location broker service is further executable by the processor to:
send to the mobile client, a mobile client location request, wherein the mobile client location signal sent by the mobile computing device is provided responsive to the mobile client location request;
send to the mobile client, the actual location of the mobile computing device following the sending of the mobile client location request to the mobile client; and
send instructions, from the location broker service to the mobile client, to store the actual location of the mobile computing device in a cache and refrain from sending a future mobile client location signal to the location broker service, responsive to sending the actual location of the mobile computing device to the mobile client.

15. A method performed by a location broker service executed on a location broker server, the method comprising:
receiving a mobile client location signal sent by a mobile computing device;
determining an actual location of the mobile computing device based on the mobile client location signal;
generating a single use location use token that indicates a generalized location of the mobile computing device and that does not directly indicate the actual location of the mobile computing device;

sending the location use token to the mobile computing device;

receiving a purported location use token from an ad delivery service of an ad delivery server;

verifying the purported location use token by determining that the purported location use token received from the ad delivery service is the location use token generated and sent to the mobile computing device; and upon verifying the purported location use token, sending the generalized location of the mobile computing device indicated by the purported location use token to the ad delivery service.

16. The method of claim 15, further comprising:

after verifying the purported location use token, receiving a subsequent purported location use token from the ad delivery service; and denying verification of the subsequent purported location use token based on the identifier indicating that the location use token has been used.

17. The method of claim 15, further comprising:

storing mobile client location data of the mobile computing device associated with the location use token;

retrieving the mobile client location data from storage responsive to verifying the purported location use token; and generating the generalized location of the mobile computing device sent to the ad delivery service based on the mobile client location data.

18. The method of claim 15, further comprising:

storing mobile client locations of a plurality of mobile client computing devices, including the actual location of the mobile computing device and user demographic data for the plurality of mobile clients including user demographic data for the mobile client;

to identify a subset of the plurality of mobile clients having target user demographic data including the mobile client, calculating a geographic density based on a quantity of the plurality of mobile client computing devices within a predetermined area; and verifying the purported location use token received from the ad delivery service by further determining that the geographic density is above a geographic density threshold.

19. The method of claim 18, wherein the target user demographic data is one or more of an age, a gender, a language, a behavior, and a psychographic characteristic.

20. The method of claim 15, further comprising:

sending to the mobile client, a mobile client location request, wherein the mobile client location signal sent by the mobile computing device is responsive to the mobile client location request;

sending to the mobile client, the actual location of the mobile computing device following the sending of the mobile client location request to the mobile client; and sending instructions, from the location broker service to the mobile client, to store the actual location of the mobile computing device in a cache and refrain from sending a future mobile client location signal to the location broker service, responsive to sending the actual location of the mobile computing device to the mobile client.

* * * * *